(12) United States Patent
Lemunier

(10) Patent No.: US 12,459,169 B2
(45) Date of Patent: Nov. 4, 2025

(54) METHOD FOR MANUFACTURING A FLEXIBLE THREE-DIMENSIONAL STRUCTURE AND FLEXIBLE STRUCTURE OBTAINED BY THE METHOD

(71) Applicant: AIR BORN, La Rochelle (FR)

(72) Inventor: Mathieu Lemunier, La Rochelle (FR)

(73) Assignee: AIR BORN, La Rochelle (FR)

( * ) Notice: Subject to any disclaimer, the term of this patent is extended or adjusted under 35 U.S.C. 154(b) by 0 days.

(21) Appl. No.: 18/255,330

(22) PCT Filed: Dec. 3, 2021

(86) PCT No.: PCT/EP2021/084225
§ 371 (c)(1),
(2) Date: May 31, 2023

(87) PCT Pub. No.: WO2022/117848
PCT Pub. Date: Jun. 9, 2022

(65) Prior Publication Data
US 2024/0001595 A1   Jan. 4, 2024

(30) Foreign Application Priority Data
Dec. 4, 2020   (FR) ...................................... 2012693

(51) Int. Cl.
*B29C 41/08*   (2006.01)
*B29C 33/38*   (2006.01)
(Continued)

(52) U.S. Cl.
CPC .............. *B29C 41/08* (2013.01); *B29C 33/38* (2013.01); *B29C 33/448* (2013.01); *B29C 41/38* (2013.01);
(Continued)

(58) Field of Classification Search
CPC ....... B29C 51/30; B29C 33/448; B29C 33/52; B29C 45/4457; B29C 41/08; B29C 33/38;
(Continued)

(56) References Cited

U.S. PATENT DOCUMENTS 6,263,817 B1   7/2001   Tajima et al.
2009/0004936 A1   1/2009   Mollis
(Continued)

FOREIGN PATENT DOCUMENTS

JP   H07102456 A   4/1995

OTHER PUBLICATIONS

International Search Report for PCT/EP2021/084225 mailed Feb. 3, 2022, 6 pages.
(Continued)

*Primary Examiner* — Monica A Huson
(74) *Attorney, Agent, or Firm* — NIXON & VANDERHYE

(57) ABSTRACT

Disclosed is a method for manufacturing a flexible three-dimensional structure, characterised in that it includes the following steps: preparing a temporary mould defined by a peripheral surface; positioning a support structure on at least one portion of the peripheral surface of the temporary mould; decomposing the temporary mould; and extracting the decomposed temporary mould.

15 Claims, 8 Drawing Sheets

(51) Int. Cl.
    *B29C 33/44*     (2006.01)
    *B29C 41/38*     (2006.01)
    *B29L 22/02*     (2006.01)
    *B63C 9/105*     (2006.01)

(52) U.S. Cl.
    CPC ......... *B29L 2022/02* (2013.01); *B63C 9/1055* (2013.01)

(58) Field of Classification Search
    CPC ..... B29C 41/38; B63B 32/51; B29L 2022/02; E04H 2015/205; D03D 1/02; B63C 9/1055
    See application file for complete search history.

(56) References Cited

U.S. PATENT DOCUMENTS

2016/0082674 A1    3/2016    Kray et al.
2018/0073371 A1*    3/2018    Varney ................. B22C 13/085

OTHER PUBLICATIONS

Written Opinion of the ISA for PCT/EP2021/084225 mailed Feb. 3, 2022, 7 pages.

* cited by examiner

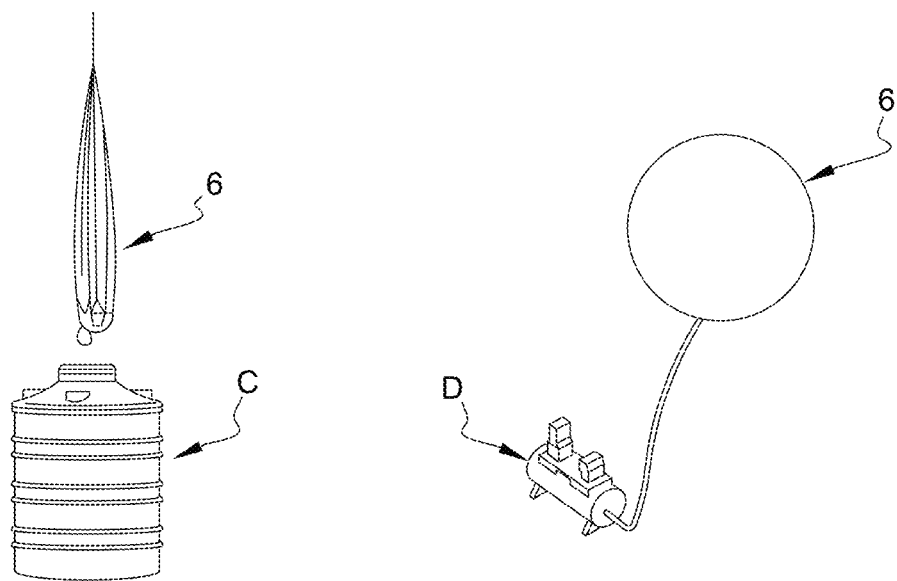
Fig. 17  Fig. 18
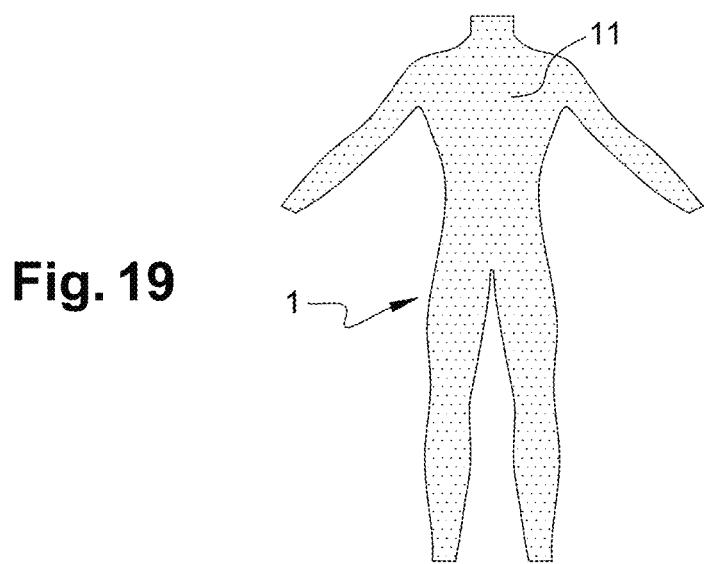
Fig. 19

METHOD FOR MANUFACTURING A FLEXIBLE THREE-DIMENSIONAL STRUCTURE AND FLEXIBLE STRUCTURE OBTAINED BY THE METHOD

CROSS-REFERENCE TO RELATED APPLICATIONS

This application is the U.S. national phase of International Application No. PCT/EP2021/084225 filed Dec. 3, 2021, which designated the U.S. and claims priority to FR 2012693 filed Dec. 4, 2020, the entire contents of each of which are hereby incorporated by reference.

TECHNICAL FIELD OF THE INVENTION

The present invention relates to the technical field of flexible structures manufacturing.

More particularly, it relates to a method for manufacturing a three-dimensional flexible structure, as well as the flexible structure obtained by the method.

STATE OF THE ART

Flexible structures are used in many fields for making, for example, swimming or diving suits, inflatable structures, stretched membranes, mattresses, cushions, for various aesthetic or utilitarian purposes, for example in the fields of sport, clothing, industry, architecture or furniture.

Generally, flexible structures can be obtained by patterning and cutting rolls of fabric, film or coated textiles, then assembling the different patterns, for example by sewing, welding, bonding, or by a combination of several techniques of assembly.

Flexible structures are then filled or stretched to obtain their final shape of use.

For example, in the case of clothes, flexible structures are slipped on the body and that is the body volume that gives them their final shape. Flexible structures are stretched by the pneumatic pressure of a fluid that gives them their final shape. Cushions or mattresses are filled, for example by foams or balls, and this filling gives them their final shape. Stretched membranes are tensioned by a mechanical pre-tensioning, and this pre-tensioning gives them their final shape.

However, the necessity to use pre-cut shape assembly techniques implies the presence of sewing, welding, bonding or other joints, which may create fragility areas, leaks and/or surface discontinuity.

Moreover, to reinforce the flexible structures and allow the generation of a greater plurality of shapes, it is possible to make partitions or padding systems inside the flexible structure, in particular for inflatable structures.

However, the techniques required for implementing these arrangements are complex and generally tricky to implement. In addition, in the flexible structures obtained, the areas that are not directly retained by the partition or padding fastenings tend to synclastic deformation.

DISCLOSURE OF THE INVENTION

In order to remedy the above-mentioned drawbacks of the state of the art, the present invention proposes a method for manufacturing a flexible three-dimensional structure, characterised in that it comprises the following operations:
preparing a temporary mould delimited by a peripheral surface,
positioning a support structure on at least part of the peripheral surface of said temporary mould,
decomposing said temporary mould,
extracting said decomposed temporary mould.

If needed, a hole or a valve may be provided on the support structure for evacuation or extraction of the decomposed temporary mould. The hole may be plugged after evacuation of the decomposed temporary mould.

If needed, a pressurized fluid and/or small fragments of foam block or other solid may be used to fill the space of the temporary volume that has been decomposed and extracted.

The manufacturing method according to the invention makes it possible to obtain flexible structures of any shape, without any visible assembly joints.

Other non-limiting and advantageous features of the method according to the invention, taken individually or according to all the technically possible combinations, are the following:

According to a possible embodiment, the method may consist in using a temporary mould made of a material decomposable by contact with a suitable chemical decomposition product, the operation of decomposing said temporary mould being made by contact of the latter with said chemical decomposition product. Therefore, it may for example be used a temporary mould made of a material of the polystyrene type and a chemical decomposition product of the solvent type.

According to another embodiment, the method may consist in using a temporary mould made of a heat-decomposable material, the operation of decomposing said temporary mould being made by contact of the latter with a source of heat. Therefore, it may for example be used a temporary mould made of a material of the wax type capable of being decomposed to liquid state with a source of heat.

According to another possibility, the method may consist in using a temporary mould made of a material decomposable by the combination of at least two decomposition techniques (chemical and heat decomposition).

According to an embodiment, the operation of positioning a support structure on at least part of the peripheral surface of the temporary mould comprises an operation of coating a flexible polymerizable material in one or more layers on at least part of the peripheral surface of the temporary mould.

According to another embodiment, the operation of positioning a support structure on at least part of the peripheral surface of the temporary mould comprises an operation of braiding or weaving one or more threadlike organs on at least part of the peripheral surface of said temporary mould.

According to still another embodiment, the operation of positioning a support structure on at least part of the peripheral surface of the temporary mould comprises an operation of assembling different patterns of fabric, coated or not.

The operation of positioning a support structure on at least part of the peripheral surface of said temporary mould may consist of the combination of different techniques or embodiments described hereinabove.

For example, this operation may consist of the combination of an operation of braiding or weaving one or more threadlike organs on at least part of the peripheral surface of said temporary mould and an operation of applying one or several layers of polymerizable coating.

According to still another embodiment, the method comprises an operation of positioning a tight peripheral lining about the peripheral surface of the temporary mould, delimiting an internal volume intended to be filled with a pressurized filling fluid, to obtain an inflatable structure.

This operation of positioning the tight peripheral lining may be made by positioning said support structure made tight; it may also be made by adding a tight envelope on said support structure.

According to still another feature, the method comprises, after the operation of positioning a support structure on at least part of the peripheral surface of the temporary mould:
- an operation of connecting different portions of the support structure by at least one organ passing through said temporary mould, followed by
- said operation of adding a tight envelope on said support structure (for example, by applying a layer of polymerizable coating).

Said operation of connecting different portions of the support structure by at least one organ passing through said temporary mould may consist of using at least one flexible threadlike organ and making a plurality of successive passages of said at least one flexible threadlike organ through said temporary mould and said associated support structure, in the manner of a sewing operation.

Said operation of connecting different portions of the support structure by at least one organ passing through said temporary mould may consist of using at least one flexible or rigid threadlike element and connecting different portions of said support structure by said flexible or rigid threadlike elements, in the manner of a padding operation.

The present invention also relates to an inflatable structure obtained by the method described hereinabove, said inflatable structure comprising at least one support structure, different portions of which are remotely connected by a plurality of threadlike elements, and a tight envelope that covers said at least one support structure and said plurality of threadlike elements, said tight envelope delimiting an internal volume intended to be filled with a pressurized filling fluid and comprising means adapted for filling and draining said filling fluid, and some at least of said threadlike elements being obtained by passages through said support structure in the manner of a sewing, consisting in successive passages of at least one flexible threadlike organ through said support structure, or in the manner of a padding operation.

Some at least of the threadlike elements may have different lengths and/or be arranged nonparallel with respect to each other.

Obviously, the different features, alternatives and embodiments of the invention can be associated with each other according to various combinations, insofar as they are not incompatible or exclusive with respect to each other.

DETAILED DESCRIPTION OF THE INVENTION

Moreover, various other features of the invention emerge from the appended description made with reference to the drawings that illustrate non-limiting embodiments of the invention, and wherein:

FIG. 17 is a schematic view that illustrates the operation of decomposing the temporary mould and extracting the decomposed temporary mould out of the internal volume of the flexible structure of FIG. 16;

FIG. 18 is a schematic view that illustrates the operation of pressurizing the flexible structure of FIG. 17 by a pressurized filling fluid;

FIG. 19 is a schematic view of a temporary mould adapted for manufacturing a three-dimensional flexible structure according to an alternative embodiment of the method according to the invention, here in the form of a swimming or diving suit;

Figure 1:
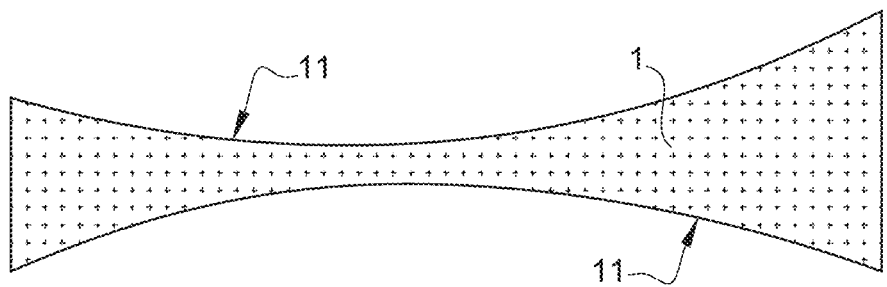
FIG. 1 is a schematic cross-sectional view of a temporary mould adapted for manufacturing an inflatable structure according to the invention.
Figure 2:
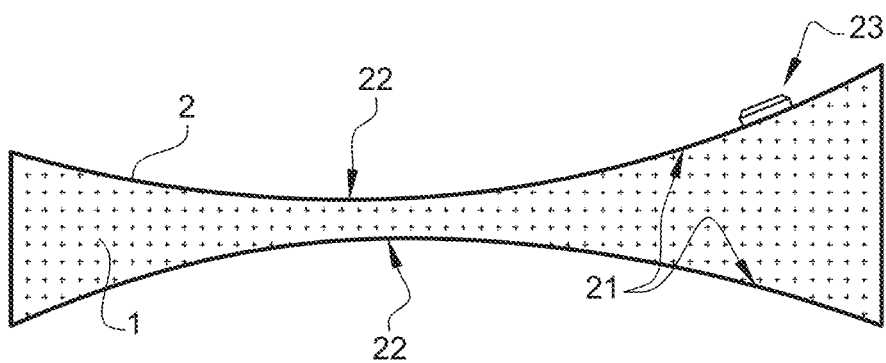
FIG. 2 is a schematic view that shows the temporary mould of FIG. 1 covered with a support structure.

It is to be noted that, in these figures, the structural and/or functional elements common to the different alternatives may have the same references.

FIGS. 1 to 8 illustrate a method for manufacturing an inflatable structure according to the invention comprising a tight envelope delimiting an internal volume intended to be filled with a pressurized filling fluid, said method consisting in:
- preparing a temporary mould delimited by a peripheral surface,
- positioning a support structure on the peripheral surface of said temporary mould,
- connecting different portions of said support structure by a plurality of threadlike elements passing through said temporary mould, decomposing said temporary mould, extracting said decomposed temporary mould out of said internal volume, covering the support structure by a tight envelope, and introducing a filling fluid into the internal volume of the inflatable structure.

1—Step/operation of preparing the temporary mould (FIG. 1):

This operation consists in generating a rigid or semi-rigid temporary mould 1, the contour of which is delimited by a peripheral surface 11.

The general shape of the peripheral surface 11 of the temporary mould 1 corresponds to the definitive shape of the three-dimensional inflatable structure that is desired to be obtained, or is close to this definitive shape.

This temporary mould 1 may be obtained for example by three-dimensional machining, moulding, sculpture or aggregation of different elements.

The material used to make the temporary mould 1 is chosen among the materials adapted to be perforated, for its later perforation by threadlike elements.

In particular, the material of the temporary mould 1 is adapted to be perforated, manually or mechanically, directly by one or several threadlike elements, or by means of one or several needles or the like associated with the threadlike elements.

The body of this temporary mould 1 is intended to be decomposed by a later operation of destruction/decomposition/evacuation.

The material the temporary mould is consisted of may be a low-density material (for example, a material whose density is lower than 60 Kg/m3).

The material the temporary mould 1 is consisted of may be paraffin, Plastiline (Registered Trademark), soap, wax or any other material easily decomposed to liquid state under the action of heat.

The material the temporary mould 1 is consisted of may be polystyrene (PSE), glycerine, or any other polymer in the form of foam or paste easily soluble into a solvent.

2—Step/operation of positioning a support structure on at least part of the peripheral surface of the temporary mould (FIG. 2):

This step here consists in adding or conforming on at least part of the peripheral surface 11 of the temporary mould 1, a support structure 2 different portions of which are intended to be connected by threadlike elements passing through said temporary mould 1.

The support structure 2 may be in the form of one or several elements. It has an internal surface 21 intended to come into contact with the peripheral surface 11 of the temporary mould 1, and an opposite external surface 22.

The support structure 2 may cover part only of the peripheral surface 11 of the temporary mould 1, but, preferably, it covers the entirety of the peripheral surface 11 of the temporary mould 1.

More particularly, the support structure 2 here consists of an intermediate envelope 2 delimited by an internal intermediate envelope surface 21 and by an external intermediate envelope surface 22; and this intermediate envelope 2 has a general shape identical or almost identical to that of the peripheral surface 11 of the temporary mould 1 and covers the entirety of this peripheral surface 11. This support structure in the form of an intermediate envelope 2 may for example be obtained by application of a polymerizable coating, braiding or weaving of threadlike elements, or made of hot or cold conformable material(s).

This intermediate envelope 2 may be composed of one or several layers of flexible or semi-rigid materials, preferably with a low elongation.

The material has to be perforable or pierceable to allow the threadlike elements to pass through. It may be tight or not.

It is possible to make a woven fabric on the temporary mould in the manner of a filament winding operation. It is possible to make a braided fabric on the temporary mould in the manner of a rope braiding operation.

It is possible to apply one or several layers of polymerizable coating, made of silicone, polyurethane (PU), polyvinyl chloride (PVC) or other polymer, for example by spraying on the temporary mould.

The combination of the techniques for applying one or several layers of polymerizable coating and making a braided fabric around the temporary mould is recommended.

Preferably, a layer of polymerizable coating is first applied on the temporary mould, a filament braiding operation forming a fabric is then made on the first layer of polymerizable coating, and at least one second layer of polymerizable coating is applied on the fabric made by filament braiding.

It may also be used membranes, fabrics, webs, films or fibres, composite or not, for example made of aramid, Kevlar, fluoropolymer (ETFE, PTFE . . . ), glass, carbon, PVC, polyester, silicone, metal net, PU, TPU, etc.

As an alternative, the support structure may be consisted of one or several profiles, or one or several plates, made of a rigid, semi-rigid or flexible material, possibly comprising pre-formed holes for the passage of the threadlike elements.

At this step, the support structure 2 may be fitted with one or several valves 23 adapted for the filling of the inflatable structure internal volume with a suitable filling fluid and the emptying thereof. In the following of the manufacturing method, the valve(s) 23 are tightly secured to the tight envelope of the inflatable structure.

3—Step/Operation of Connecting Different Portions of the Support Structure by a Plurality of Threadlike Elements Passing Through the Temporary Mould (FIGS. 3 and 4):

This operation consists in connecting, by sewing or padding, different portions of the support structure 2, through the temporary mould 1, by means of a plurality of threadlike elements 3.

The purpose of the sewing or padding operation is to generate a network of threads or links making it possible to more or less fix the shape of the support structure 2 when the latter will subsequently be pressurized by the filling fluid.

The threadlike elements 3 may be arranged in all the directions and in variable densities within the same inflatable structure. They may have the same length, or at least some of which may have different lengths, as a function of the final shape desired for the inflatable structure.

The threadlike elements 3 may be arranged parallel to each other, or not parallel to each other. Some groups of threadlike elements may extend parallel to each other in one direction, and one or other groups of threadlike elements may extend parallel to each other in one or several other directions.

Each threadlike element 3 of the network has to keep more or less the same size after the inflatable structure has been pressurized by a filling fluid.

To form the threadlike elements 3, it may be used any type of thread, cable, braid, link, rivet, screw or fastener, preferably flexible and with a relatively low elongation, non-degradable by the temporary mould decomposition process.

For example, it may be used threads made of nylon, polyester, polyethylene, polyamide, polypropylene, polyethylene, PTFE, Kevlar, aramid, carbon, metal, etc.

Figure 4:
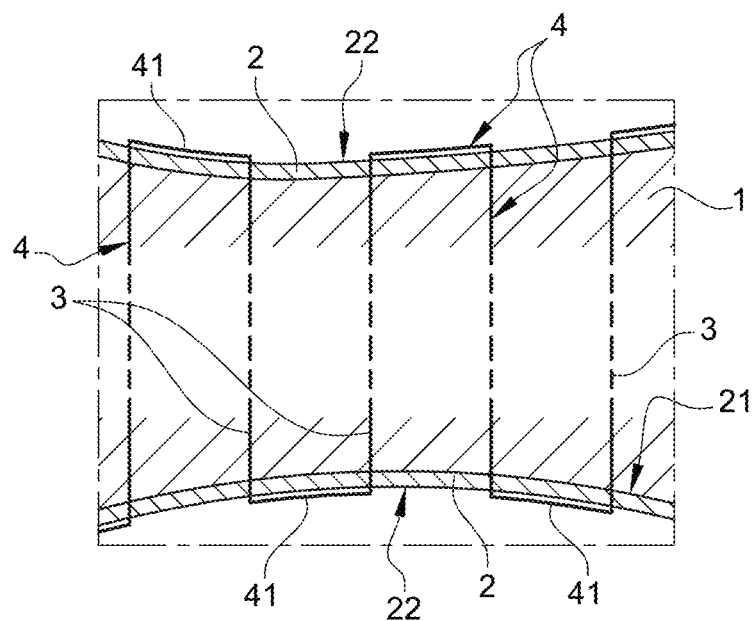
FIG. 4 is a schematic view showing in detail the connection operation illustrated in FIG. 3.
Figure 5:
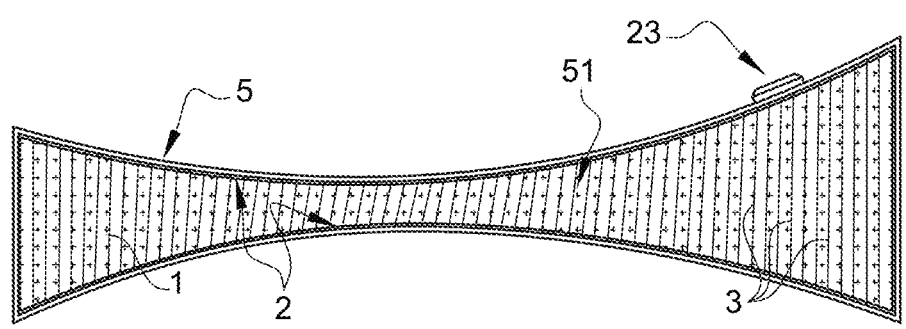
FIG. 5 is a schematic view that shows, based on FIG. 3, the covering of the temporary mould and the support structure by a tight envelope.

As schematically shown in FIG. 4, the sewing operation consists in using a flexible threadlike organ 4 and making a plurality of successive passages of this flexible threadlike organ 4 through the temporary mould 1 and the associated support structure 2, to obtain a plurality of threadlike elements 3.

The threadlike elements 3 are assembled to each other by sections of threadlike organ 41 bearing against the external intermediate envelope surface 22.

One or several threadlike organs 4 may be used to form the desired network of threadlike elements. The ends of the threadlike organs 4 are secured to the support structure 2 by any suitable means.

The padding operation (not shown) consists in using a plurality of unitary threadlike elements, flexible, semi-rigid or rigid, that pass through the temporary mould 1 as well as the support structure 2, and the two ends of which are locked by a knot, a button or by any suitable means, against the external side of the support structure.

The positions, number and distribution of the threadlike elements 3 are adapted according to the inflatable structure concerned, in particular as a function of the desired strength and aesthetics.

4—Step/operation of covering, with a tight peripheral lining, in the form of a tight envelop, the support structure and the potential portion of the peripheral surface of the temporary mould that is not covered by the support structure (FIG. 5):

This operation consists in ensuring the tightness of the structure, so that the later can be pressurized by a filling fluid.

The tight envelope 5, forming the tight peripheral lining, is delimited by an internal tight envelope surface located opposite the support surface 2 and the temporary mould 1, and by an opposite, external tight envelope surface.

The internal tight envelope surface delimits the internal volume 51 of the three-dimensional inflatable structure.

This tight envelope 5 preferably has the same shape as the peripheral surface 11 of the temporary mould 1; it is conformed on the latter, over the support structure 2.

The tight envelope 5 may be obtained by tightly spraying a polymer directly on the support structure 2 and the temporary mould 1.

Preferably, the internal tight envelope surface 5 is then secured to the support structure 2 and potentially to the peripheral surface of the temporary mould 1 that is not covered by the support structure 2. This securing is made by any suitable means, in particular by bonding by means of a suitable glue, or by welding.

As an alternative, the tight envelope 5 can be created on the support structure 2 and on the potential portion of the peripheral surface 11 of the temporary mould 1 that is not covered by the support structure 1, by means of a liquid, semi-liquid or pasty coating product, that is hot or cold conformable and adapted to be transformed, for example by polymerisation, into a flexible tight lining.

The tight envelope 5 may be composed of one or several layers of tight, flexible or semi-rigid, materials. It may be covered with a protective shell.

If it is added and bonded or welded on the support structure 2, the tight envelope 5 may be consisted of one or several layers or thicknesses of flexible or semi-rigid tight materials. It is also possible to use films or membranes, composite or not, for example made of aramid, Kevlar, fluoropolymer (ETFE, PTFE . . . ), glass fibre, carbon, PVC, polyester, silicone, PU, TPU, EVA, metal sheets, etc.

If it is made by addition of a coat or paint layer on the support structure 2, the tight envelope 5 may be obtained for example by coating of a layer of polyurethane, silicone or another polymer.

As mentioned hereinabove, the inflation/drain valve(s) 23 are tightly secured to the tight envelope 5.

In an alternative embodiment, the inflation/drain valve(s) 23 of the inflatable structure may be added and fastened to the tight envelope only at this step of the manufacturing method.

5—Step/operation of decomposing the temporary mould and step/operation of extracting the decomposed temporary mould out of the internal volume of the inflatable structure (FIG. 6):

These two steps have for object to eliminate all or part of the temporary mould 1 so that its volume can be replaced by a pressurized filling fluid.

The material the temporary mould 1 is consisted of has to be provided destructible/decomposable by a suitable chemical decomposition product or by a suitable physical means.

For example, a temporary mould 1 made of polystyrene may be decomposed/dissolved by a chemical decomposition product such as acetone.

Another possibility consists in using a temporary mould 1 made of a heat-decomposable material (for example, a wax), the operation of decomposing said temporary mould 1 being made by contact with a source of heat.

Figure 6:
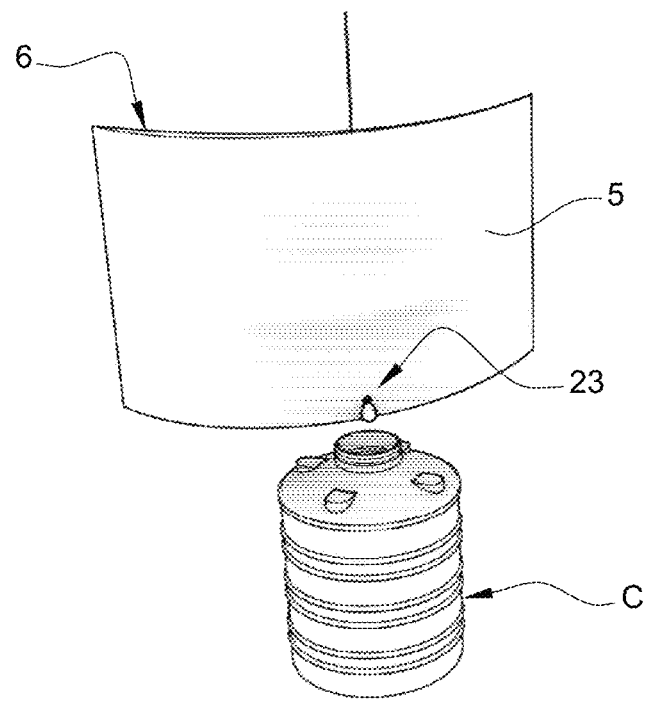
FIG. 6 is a schematic view that illustrates the operation of decomposing the temporary mould and extracting the decomposed temporary mould out of the internal volume of the three-dimensional inflatable structure.

As illustrated in FIG. 6, the extraction of the destroyed/decomposed temporary mould out of the internal volume of the inflatable structure can be made by the valve(s) 23 serving for inflating/deflating the inflatable structure.

It is also possible to provide one or several trap doors or holes for access to the internal volume, specifically dedicated to this extraction.

The inflatable structure 6 is obtained, which integrates a network of threadlike elements 3, ready to be pressurized by a filling fluid.

In FIG. 6 is illustrated the container C for collecting at least part of the decomposed temporary mould rests.

6—Step/operation of pressurizing the inflatable structure by a pressurized filling fluid (FIG. 7):

The pressurization of the inflatable structure 6 may be made by means of different gases or liquids. It is for example possible to use air, water, oil, helium, argon, krypton, xenon, etc.

Figure 7:
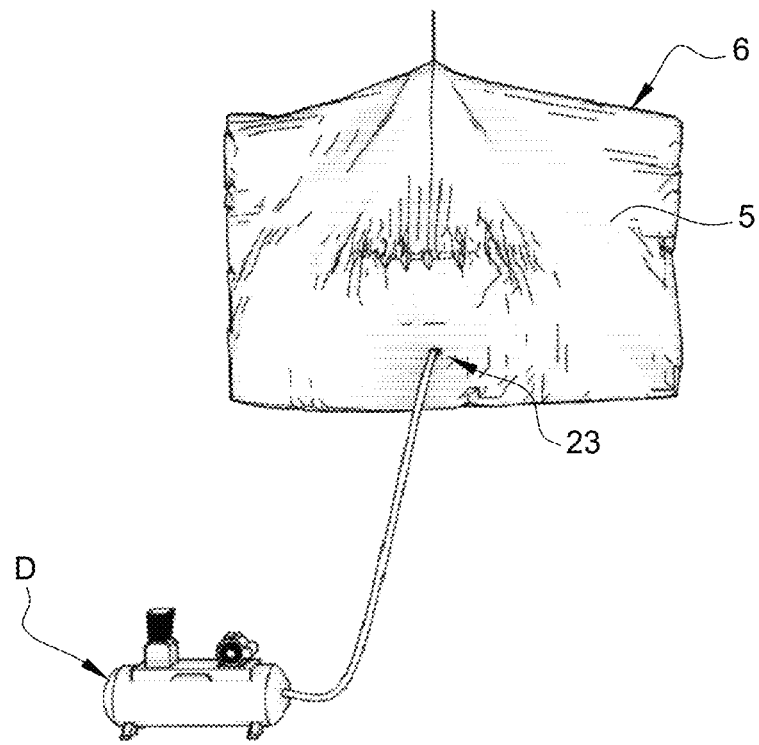
FIG. 7 is a schematic view that illustrates the operation of pressurizing the three-dimensional inflatable structure by a pressurized filling fluid.

As illustrated in FIG. 7, a compressor D may be used to inflate the inflatable structure 6 with air through the valve 23.

Figure 8:
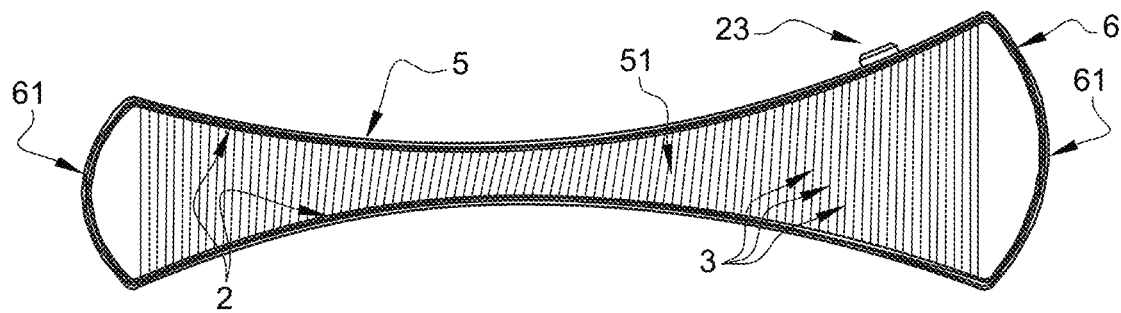
FIG. 8 is a schematic view that illustrates the inflatable structure of FIG. 5, pressurized by the filling fluid.

The inflatable structure 6 obtained is for example that illustrated in FIG. 8, whose internal volume 51 is filled with pressurized fluid.

FIG. 8 shows the support structure 2 and the tight envelope 5 shaped by the filling fluid and the network of threadlike elements 3.

Here, the lateral ends 61 of the inflatable structure 6, devoid of holding threadlike elements 3, comprise synclastic surfaces (having a convex curve seen from the outside).

The solidity, strength, deformability and stiffness of the inflatable structure obtained are function in particular of the typology of the materials (envelopes, threadlike elements) and fluids used, as well as the volume, the shape of the structure and the internal pressure.

Figure 9:
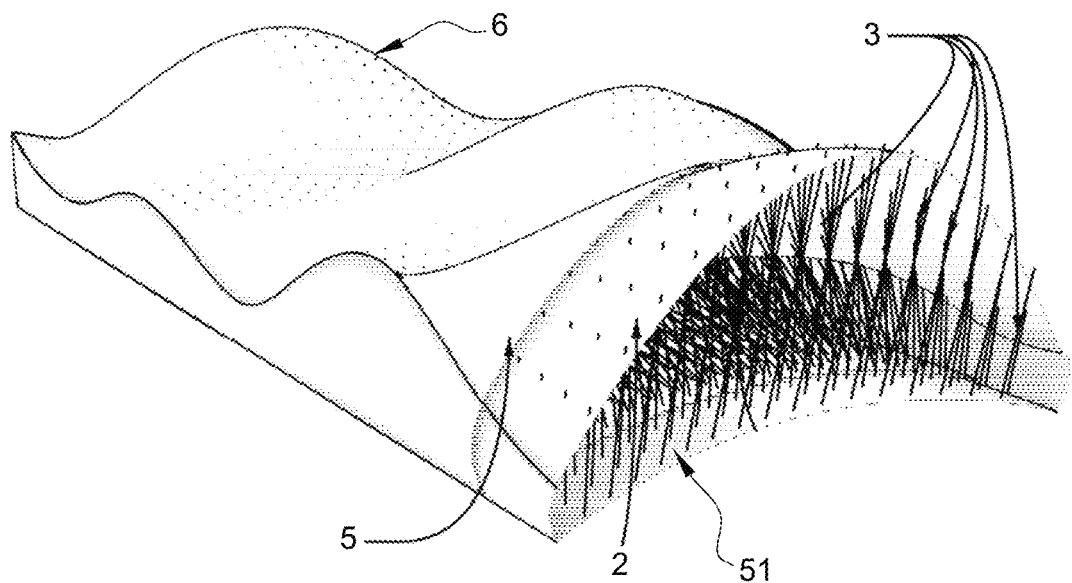
FIG. 9 is a schematic perspective view, in partial cross-section, that illustrates an alternative inflatable structure according to the invention.
Figure 10:
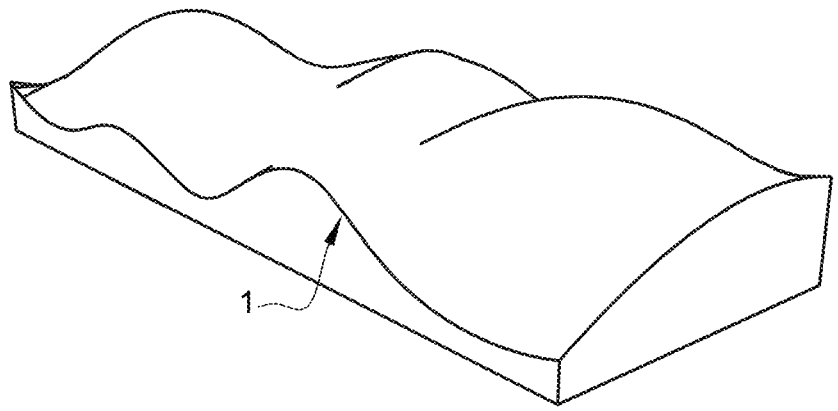
FIG. 10 is a schematic perspective view of a temporary mould adapted for obtaining the inflatable structure illustrated in FIG. 9.

By way of another example, an alternative embodiment of an inflatable structure 6 is shown in FIG. 9, made from a temporary mould 1 as illustrated in FIG. 10.

The inflatable structure 6 of FIG. 9 comprises a tight envelope 5 secured to a support envelope 2 associated with a network of threadlike elements 3.

The internal volume 51 of this inflatable structure 6 is filled by a pressurized fluid after decomposition of the temporary mould 1.

For all the embodiments, in an alternative implementation of the invention, the installation of the tight envelope 5 may be made after the step of decomposing the temporary mould 1.

Although it is possible to obtain almost any shape of inflatable structure by the method according to the present invention, it may be desirable, for technical questions, for example related to the size, the limits of the production tool, problems of transport or implementation, questions of security, redundancy, articulation, addition on, in or through external elements, etc . . . , to couple or fasten to each other or to external elements, different volumes, compartments or panels obtained by the manufacturing method defined by the present invention, for example by welding or by bonding, by mechanical fastenings, by articulated links, by assembly profiles, etc.

Figure 3:
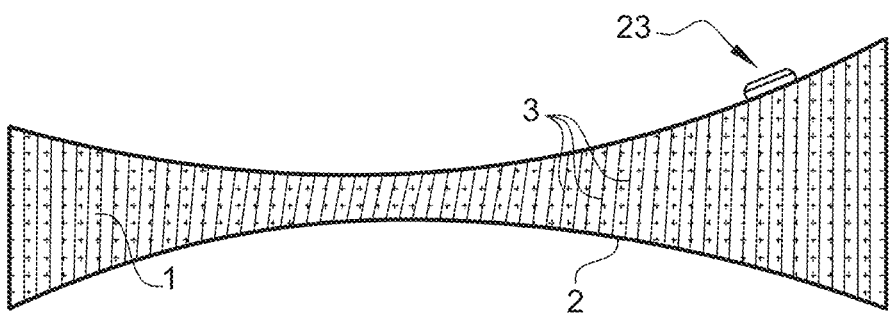
FIG. 3 is a schematic view that illustrates, based on FIG. 2, the connection of different portions of the support structure by a plurality of threadlike elements passing through the temporary mould.
Figure 11:
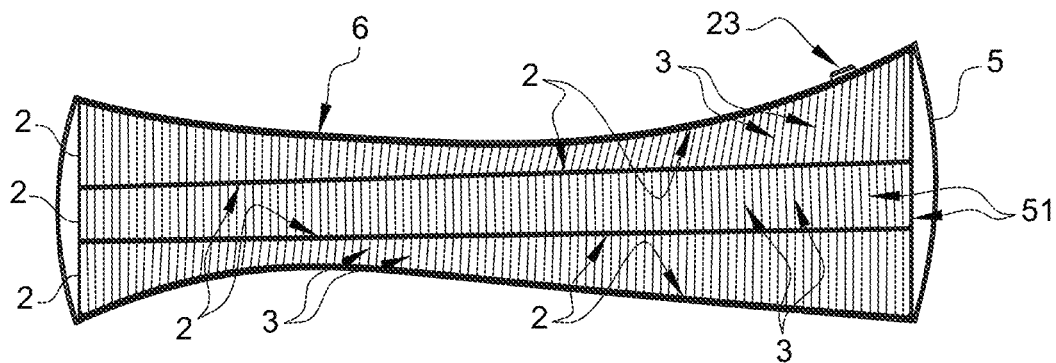
FIG. 11 is a schematic cross-sectional view that illustrates another possible embodiment of an inflatable structure according to the invention.

For example, as illustrated in FIG. 11, it is possible to fasten to each other, for example by sewing, bonding, welding or other, different volumes previously made by sewing of a support structure (in the form of a primary envelope) through a temporary mould (as described at step 3 of the method—see FIGS. 3 and 4). The so-created structure can then be sealed by an external peripheral tight envelope 5, according to the technique described at the above-mentioned step 4 of the manufacturing method.

The different sub-volumes made by sewing of the support structures 2 through their dedicated temporary mould then create a single compartmented volume that is enclosed inside the tight envelope 5.

Such an inflatable structure 6 comprises a single internal inflatable volume 51 and may comprise a singe inflation/drain valve 23.

Figure 12:
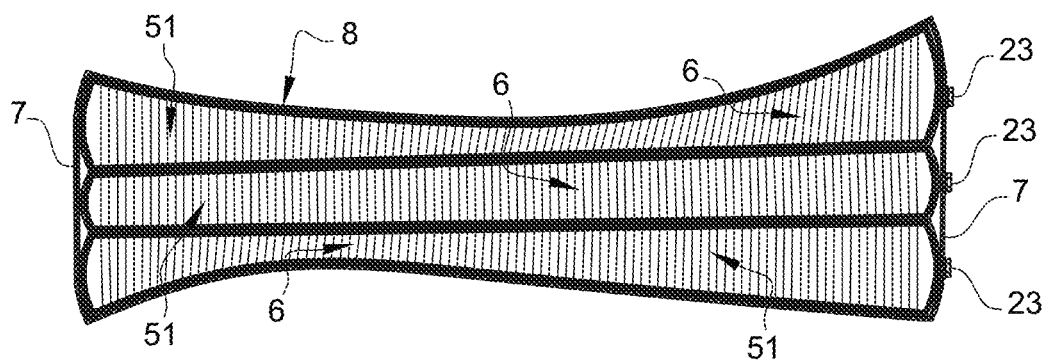
FIG. 12 is a schematic cross-sectional view that illustrates still another possible embodiment of an inflatable structure according to the invention.

Another possibility, schematically illustrated in FIG. 12, consists in making several inflatable structures 6 each comprising a support structure 2, a network of threads 3 and a tight envelope 5 fitted with at least one valve 23, and placing these different inflatable structures 6 inside an external shell 7.

The external shell 7 may be in any form: envelope, tight or not (for example, a fabric made of Kevlar fibres, coated or not), flexible or semi-rigid mesh or netting (for example, a metal net).

The so-obtained inflatable assembly 8 comprises a plurality of distinct pneumatic chambers, each pressurized by one or several fluids.

Figure 13:
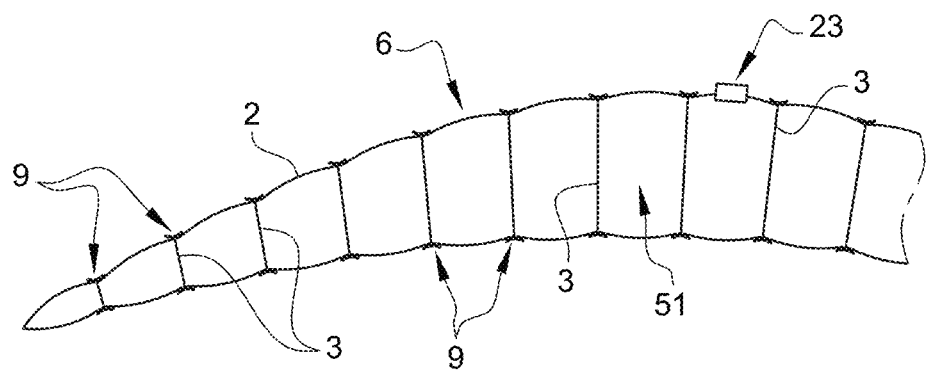
FIG. 13 is a schematic and partial view that illustrates still another possible embodiment of an inflatable structure according to the invention.
Figure 14:
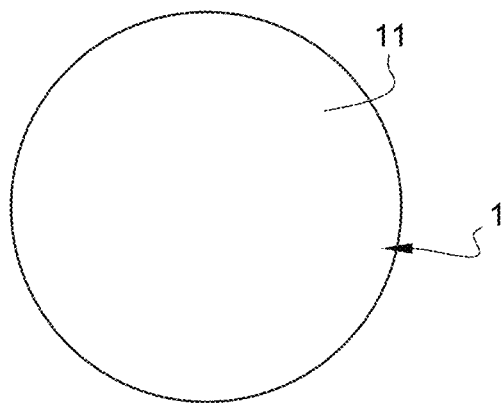
FIG. 14 is a schematic view of a temporary mould adapted for manufacturing a flexible structure according to an alternative embodiment of the method according to the invention.

As another alternative, as illustrated in FIG. 13, the support structure 2 can be provided as a tight envelope, and after the operation of connecting the threadlike elements 3 by sewing or padding (above-mentioned step 3 of the manufacturing method), the tightness of the inflatable structure 6 is made, by sealing means 9, only in the areas of the support structure 2 in which the tightness has been degraded (that is to say at the sewing or padding areas).

For example, the sealing means 9 consist of a material preformed as a plate or a film, bounded or welded; they may also consist of a suitable painting or a coating of a layer of polyurethane, PVC, silicone, or other.

FIGS. 14 to 18 illustrate an alternative embodiment of the method according to the invention, still for obtaining a three-dimensional flexible inflatable structure.

The corresponding method consists in:
preparing a temporary mould 1 delimited by a peripheral surface 11 (FIG. 14),
installing an inflation/drain valve 23 on the peripheral surface 11 of the temporary mould 1 (FIG. 15),
positioning a tight peripheral lining 2, 5 on the peripheral surface 11 of said temporary mould 1 (FIG. 16),
decomposing said temporary mould 1 (FIG. 17),
extracting said decomposed temporary mould (FIG. 17),
inflating the inflatable structure 6 with air through the valve 23, by means of a compressor D (FIG. 18).

1—Step/Operation of Preparing the Temporary Mould 1 (FIG. 14):

This operation consists in generating a rigid or semi-rigid temporary mould 1, the contour of which is delimited by a peripheral surface 11.

The general shape of the peripheral surface 11 of the temporary mould 1 corresponds to the definitive shape of the flexible structure that is desired to be obtained, or is close to this definitive shape.

This temporary mould 1 may be obtained for example by moulding, three-dimensional machining, sculpture or aggregation of different elements.

The material the temporary mould 1 is consisted of may be polystyrene, or also polyurethane, polyamide, or any other polymer easily soluble in a solvent.

The material the temporary mould 1 is consisted of may be wax able to be decomposed by heat, or any other similar material.

2—Step/Operation of Positioning a Tight Peripheral Lining 2, 5 on at Least Part of the Peripheral Surface 11 of the Temporary Mould 1 (FIG. 16):

The tight peripheral lining may be composed of one or several layers of flexible or semi-rigid materials, preferably with a low elongation.

For example, it may be composed of: a support structure 2 formed of one or several layers of braided or woven threadlike materials, covered by a tight envelope 5 formed of one or more layers of coatings or varnishes, applied by spraying, projection, infusion or by any other suitable means.

It is possible to use polymers (PVC, PU, TPU, polyester, silicone, carbon, nylon, polyethylene, polyamide . . . ), fluoropolymers (ETFE, PTFE, FEP . . . ), etc.

As an alternative embodiment, the tight peripheral lining may be formed of one or several layers of coatings or varnishes only.

Figure 15:
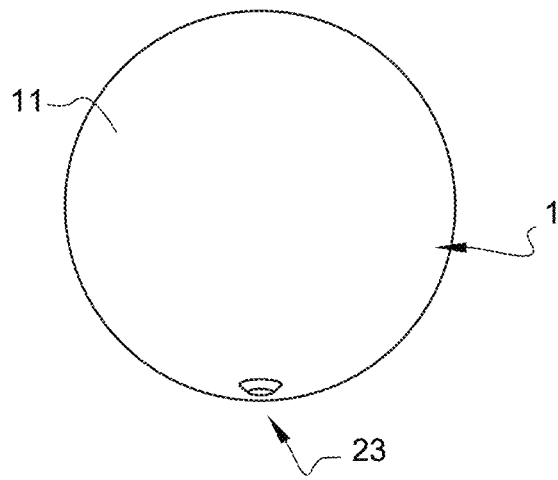
FIG. 15 is a schematic view that shows the temporary mould of FIG. 14 fitted with an inflation/drain valve.
Figure 16:
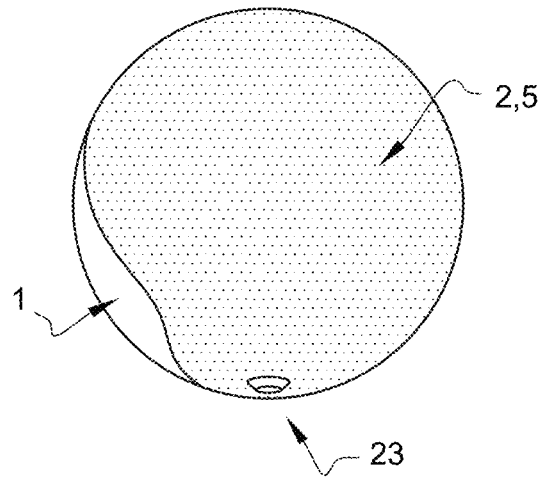
FIG. 16 is a schematic view that shows the temporary mould of FIG. 15 covered with a support structure.

According to an alternative embodiment, the inflation/drain valve 23 illustrated in FIG. 15 may be installed at this step, simultaneously to the tight peripheral lining, to later allow the filling of the inner volume of the flexible structure by a suitable filling fluid and the emptying thereof.

According to still another alternative embodiment, the tight peripheral lining can then be filled with suitable foams, or by suitable small-size solids.

Figure 20:
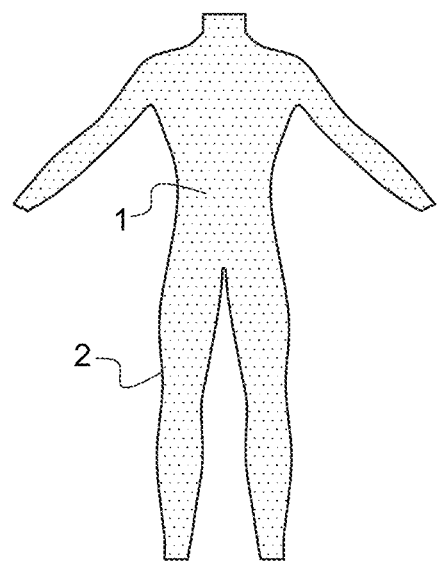
FIG. 20 is a schematic view that shows the temporary mould of FIG. 19 covered with a support structure.
Figure 21:
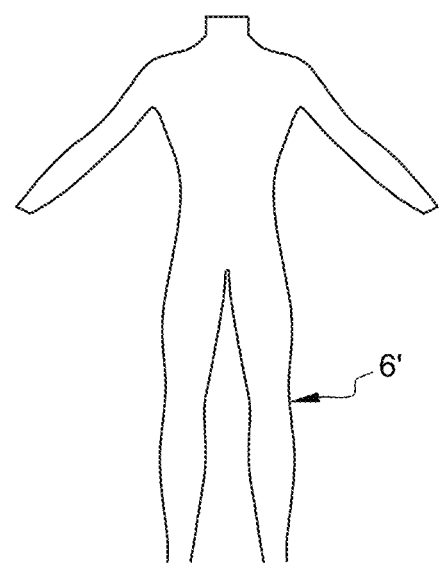
FIG. 21 is a schematic view of the three-dimensional flexible structure obtained after the destruction/decomposition of the temporary mould of FIG. 20.

FIGS. 19 to 21 illustrate an alternative embodiment of the method according to the invention, here for obtaining a three-dimensional flexible structure in the form of a swimming or diving suit.

The corresponding method consists in:
preparing a temporary mould 1 delimited by a peripheral surface 11 (FIG. 19),
positioning a peripheral lining in the form of a support structure 2 on the peripheral surface 11 of said temporary mould 1 (FIG. 20),
decomposing said temporary mould 1, identically or similarly to what has been explained hereinabove, and extracting said decomposed temporary mould, also identically or similarly to what has been explained hereinabove, to obtain the flexible structure 6' in the form of a suit as shown in FIG. 21.

1—Step/Operation of Preparing the Temporary Mould 1 (FIG. 19):

This operation consists in generating a rigid or semi-rigid temporary mould 1, the contour of which is delimited by a peripheral surface 11.

The general shape of the peripheral surface 11 of the temporary mould 1 corresponds to the definitive shape of the flexible structure that is desired to be obtained, or is close to this definitive shape.

This temporary mould 1 may be obtained for example by three-dimensional machining, sculpture or aggregation of different elements.

The material the temporary mould 1 is consisted of may be a foam, a paste or a resin, for example polystyrene, polyurethane, glycerine, or any other material easily soluble in a solvent.

The material the temporary mould 1 is consisted of may be wax, glycerine, paraffin, palm oil, soap, or any other material liable to be decomposed by heat.

2—Step/Operation of Positioning a Peripheral Lining (Support Structure 2) on at Least Part of the Peripheral Surface 11 of the Temporary Mould 1 (FIG. 20):

The peripheral lining (support structure 2) may be composed of one or several layers of flexible or semi-rigid materials, preferably with a low elongation.

For example, it may be composed of an envelope (tight or not), formed of one or several layers of coatings, elastomers or varnishes, applied by projection, spraying, infusion or by any suitable means.

It is possible to use polymers (PVC, PU, TPU, polyester, silicone, carbon nylon, polyethylene, polyamide . . . ), fluoropolymers (ETFE, PTFE, FEP . . . ), etc.

The present invention may find applications in many technical fields, for example:

Clothing: for making clothes and more particularly suits, for example swimming or diving suits . . .

Aeronautics, aerospace: for making wings, fuselages, structural parts . . .

Water sports: for making shells, recreation boards . . .

Terrestrial transport: for making tyres, bodyworks, envelopes . . .

Energy: for making wind turbine wings,

Building: for making envelopes, wall covers, beams . . .

Events, humanitarian aid: for making temporary shelters, removable structures . . .

Art: for making artistic shapes . . .

Protection: for making bumpers, helmets . . .

Industry: for making lifting systems, insulation damping systems, moulding systems, guiding systems . . .

Medical: for making anatomic structures, prosthesis, seats . . .

The invention claimed is:

1. A method for manufacturing a three-dimensional flexible structure, the method comprising:
preparing a temporary mold defined by a peripheral surface, the temporary mold being made of a heat-decomposable material;
positioning: structure on at least one portion of the peripheral surface of said temporary mold;
decomposing said temporary mold by contacting the temporary mold with a source of heat;
extracting said decomposed temporary mold; and
obtaining the three-dimensional flexible structure using the extracted decomposed temporary mold.

2. The method according to claim 1, wherein the temporary mold is made of a material decomposable by contact with a suitable chemical decomposition product, the decomposing said temporary mold being made by contact of the temporary mold with said chemical decomposition product.

3. A method for manufacturing a three-dimensional flexible structure, the method comprising:
preparing a temporary mold defined by a peripheral surface;
positioning a support structure on at least one portion of the peripheral surface of said temporary mold by coating a flexible polymerizable material in one or more layers on at least part of the peripheral surface of the temporary mold;
decomposing said temporary mold;
extracting said decomposed temporary mold; and
obtaining the three-dimensional flexible structure using the extracted decomposed temporary mold.

4. A method for manufacturing a three-dimensional flexible structure, the method comprising:
preparing a temporary mold defined by a peripheral surface;
positioning a support structure on at least one portion of the peripheral surface of said temporary mold by braiding or weaving one or more threadlike organs on at least part of the peripheral surface of said temporary mold;
decomposing said temporary mold;
extracting said decomposed temporary mold; and
obtaining the three-dimensional flexible structure using the extracted decomposed temporary mold.

5. A method for manufacturing a three-dimensional flexible structure, the method comprising:
preparing a temporary mold defined by a peripheral surface;
positioning a support structure on at least one portion of the peripheral surface of said temporary mold by assembling different patterns of fabric, coated or not;
decomposing said temporary mold;
extracting said decomposed temporary mold; and
obtaining the three-dimensional flexible structure using the extracted decomposed temporary mold.

6. A method for manufacturing a three-dimensional flexible structure, the method comprising:
preparing a temporary mold defined by a peripheral surface;
positioning a support structure on at least one portion of the peripheral surface of said temporary mold;
positioning a tight peripheral lining about the peripheral surface of said temporary mold;
delimiting an internal volume intended to be filled with a pressurized filling fluid, to obtain an inflatable structure;
decomposing said temporary mold;
extracting said decomposed temporary mold; and
obtaining the three-dimensional flexible structure using the extracted decomposed temporary mold.

7. The method according to claim 6, wherein said positioning said tight peripheral lining is made by positioning said support structure made tight.

8. The method according to claim 6, wherein said positioning said tight peripheral lining is made by adding a tight envelope on said support structure.

9. The method according to claim 8, further comprising, after the positioning the support structure on the at least one portion of the peripheral surface of said temporary mold:
- connecting different portions of said support structure by at least one organ passing through said temporary mold; and then
- said adding the tight envelope on said support structure is performed.

10. The method according to claim 9, wherein said connecting the different portions of said support structure by the at least one organ passing through said temporary mold consists of using at least one flexible threadlike organ and making a plurality of successive passages of said at least one flexible threadlike organ through said temporary mold and said associated support structure, in the manner of a sewing operation.

11. The method according to claim 9, wherein said connecting the different portions of said support structure by the at least one organ passing through said temporary mold consists of using at least one flexible or rigid threadlike element and connecting different portions of said support structure by said flexible or rigid threadlike elements, in the manner of a padding operation.

12. The method according to claim 6, further comprising positioning an inflation/drain valve on said tight peripheral lining.

13. The method according to claim 3, wherein the positioning the support structure on at least one portion of the peripheral surface of the temporary mold comprises braiding or weaving one or more threadlike organs on at least part of the peripheral surface of said temporary mold.

14. The method according to claim 3, wherein the positioning the support structure on at least one portion of the peripheral surface of said temporary mold comprises assembling different patterns of fabric, coated or not.

15. The method according to claim 4, wherein the positioning the support structure on at least one portion of the peripheral surface of said temporary mold comprises assembling different patterns of fabric, coated or not.

* * * * *